May 10, 1960     F. H. SCHWAIGER ET AL     2,936,236
METHOD OF DRAINING OFF WORT FROM A STRAINING TANK
Original Filed March 28, 1958     3 Sheets-Sheet 2
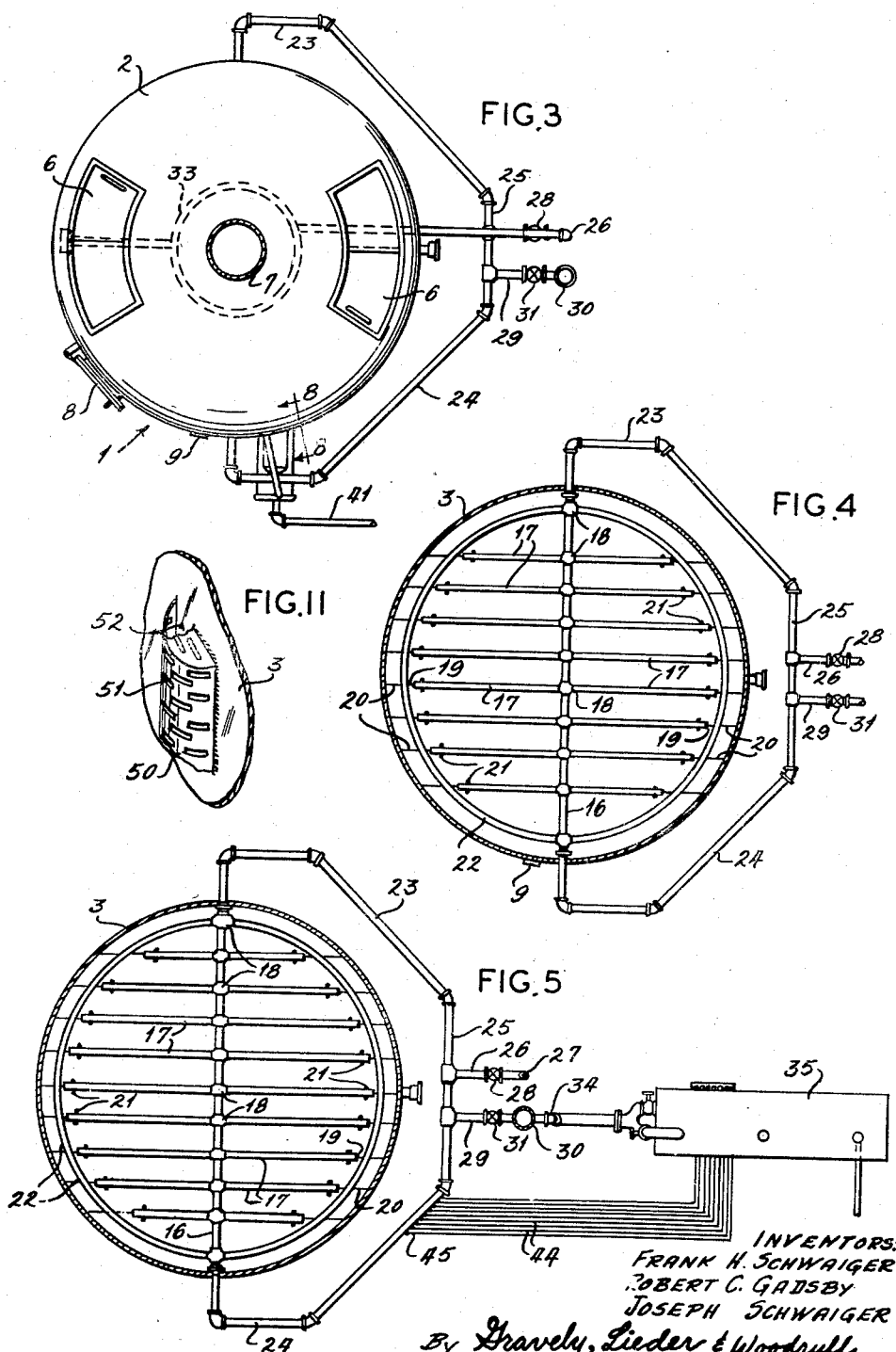
INVENTORS:
FRANK H. SCHWAIGER
ROBERT C. GADSBY
JOSEPH SCHWAIGER
By Gravely, Lieder & Woodruff
ATTORNEYS.

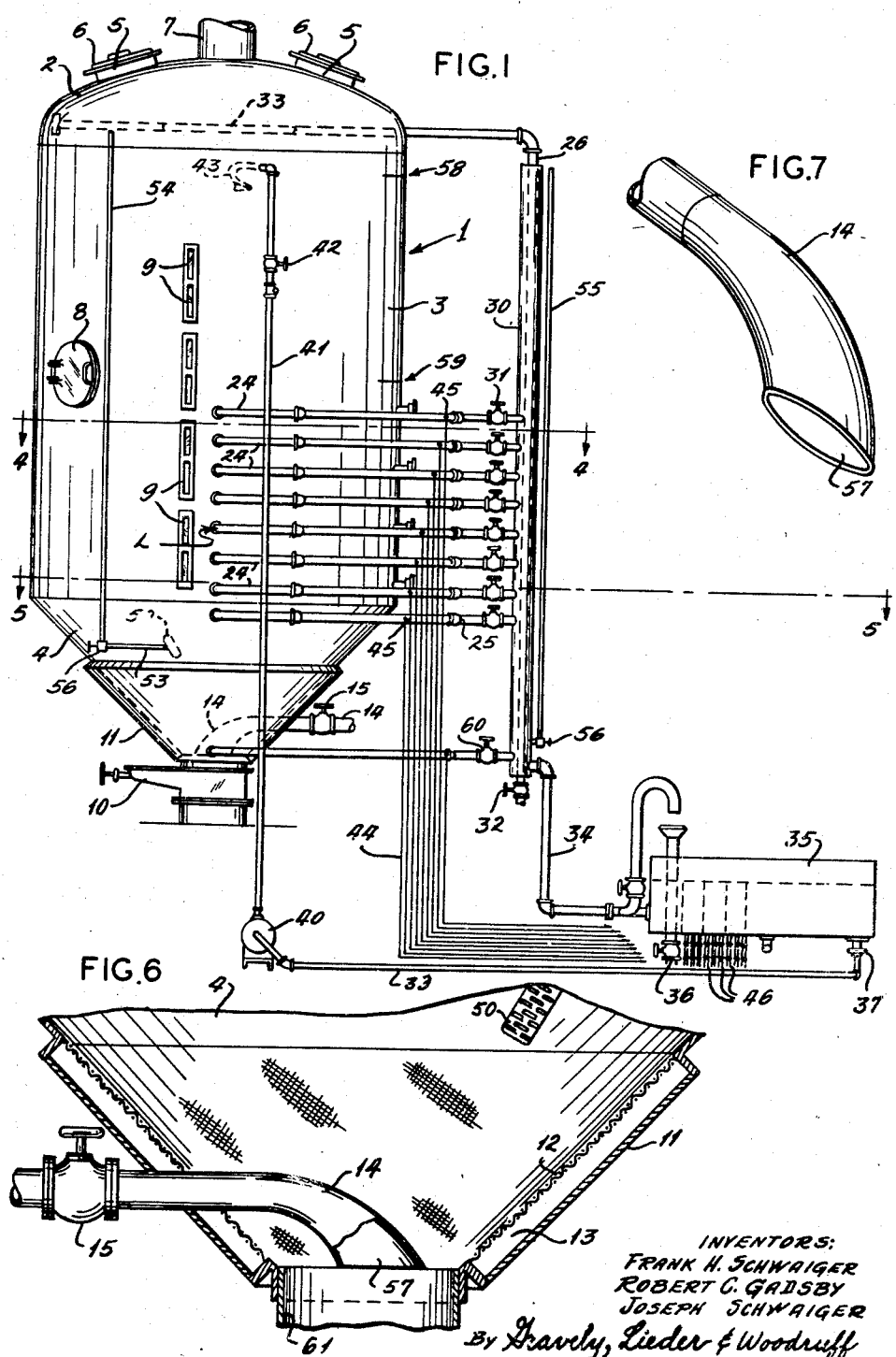

May 10, 1960 F. H. SCHWAIGER ET AL 2,936,236
METHOD OF DRAINING OFF WORT FROM A STRAINING TANK
Original Filed March 28, 1958 3 Sheets-Sheet 3
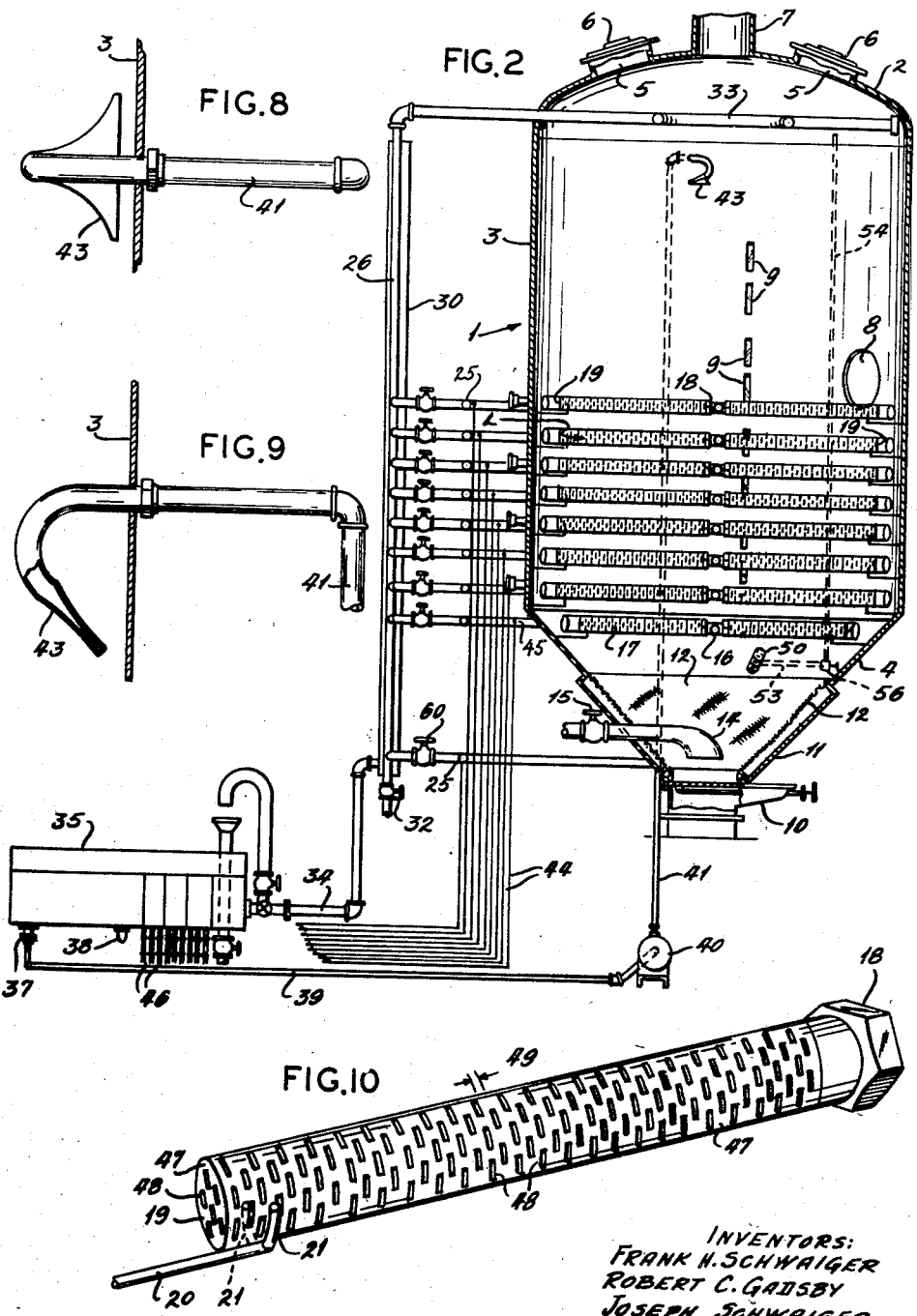
INVENTORS:
FRANK H. SCHWAIGER
ROBERT C. GADSBY
JOSEPH SCHWAIGER
By Gravely, Lieder & Woodruff
ATTORNEYS.

United States Patent Office 2,936,236
Patented May 10, 1960

2,936,236
METHOD OF DRAINING OFF WORT FROM A STRAINING TANK

Frank H. Schwaiger, Ladue, Robert C. Gadsby, Town and Country, and Joseph Schwaiger, Affton, Mo., assignors to Anheuser-Busch, Incorporated, St. Louis, Mo., a corporation of Missouri Original application March 28, 1958, Serial No. 724,561, now Patent No. 2,916,421, dated December 8, 1959. Divided and this application January 23, 1959, Serial No. 788,689

8 Claims. (Cl. 99—52)

This application is a division of our co-pending application Ser. No. 724,561, filed March 28, 1958, entitled "Straining Tank," now U.S. Patent No. 2,916,421, dated December 8, 1959.

This invention relates to a straining tank or grain extractor or lauter tub, and more particularly to a new type of straining tank for use in the brewing industry to remove extract from brewer's grains. This divisional application relates to the method of straining employed by said straining tank.

At present, the conventional type lauter tub used in the brewing industry is relatively large and expensive. Many of these lauter tubs are from twelve to twenty-five feet in diameter and have a relatively heavy and expensive power driven rake or lauter machine which rotates therein to agitate and loosen the grains. Typical devices of this sort are shown in U.S. Patent Nos. 2,014,945 and 2,150,009 and others. Some breweries use a relatively large and expensive mash filter to remove the extract from the grains. Regardless of whether the conventional lauter tub with rotating blades therein or whether the mash filter is used, this step of the brewing process has in the past been the slowest and has been one of the governing steps in the production of beer. In other words, in the usual brewing operation today, the capacity of the equipment in this step of the brewing process largely determines the capacity of the brewery.

One of the principal objects of the present invention is to increase the efficiency of the extraction of soluble substances from material within a straining tank. Another object is to provide a straining tank with the shortest exposure and contact time between the wort and grains and between the sparge water and the grains which have substances extracted therefrom, thereby extracting less of the undesired substances from the husks of the grains. This results in a cleaner and milder flavor for the resulting wort. Another object is to eliminate the mechanical agitator formerly required and avoid the formation of channels which the numerous knife blades previously cut into the grain bed.

Another object of the present invention is to provide a straining tank which is relatively small and inexpensive compared to those lauter tubs and mash filters presently used to remove extracts from grains. Another object is to increase the capacity for removing extracts from grains in a brewing operation, thereby increasing the capacity of the brewery. Another object is to provide a straining device which requires less time per batch and allows more brews per day. Another object is to provide for the fast removal of spent grains from a straining tank which can then be easily and rapidly cleaned.

Still another object is to provide a device which has a smaller initial cost and which requires fewer operators than previously required to efficiently operate a straining tank or mash filter.

These and other objects and advantages will become apparent hereinafter.

The invention is embodied in a straining tank having a conical bottom which an outlet therein, said tank having a multiplicity of draw-off levels, each draw-off level having a plurality of draw-off pipes with relatively small openings therein, and means for controlling the flow from each of said draw-off levels. The invention is also embodied in a method for drawing off the first wort in an upstanding tank through a multiplicity of draw-off levels positioned below the level of the grains, introducing water directly into the grains and drawing off the wort through said draw-off levels and controlling the flow of the wort from each of said levels.

This invention also consists in the parts and in the arrangements and combinations of parts hereinafter described and claimed. In the accompanying drawings which form part of this specification and wherein like numerals and symbols refer to like parts wherever they occur:

Fig. 1 is a side elevational view of a straining tank or grain extractor or lauter tub embodying the present invention, Fig. 2 is a side elevational view mostly in cross-section of the side opposite to that shown in Fig. 1, Fig. 3 is a top plan view thereof, Fig. 4 is a horizontal cross-sectional view taken along the line 4—4 of Fig. 1 but showing only the arrangement immediately below said line 4—4, Fig. 5 is a horizontal cross-sectional view taken along the line 5—5 of Fig. 1 showing within the tank only the piping arrangement immediately below said line 5—5, Fig. 6 is an enlarged fragmentary vertical cross-sectional view of the bottom portion of said tank, Fig. 7 is an enlarged perspective view of the inlet pipe, Fig. 8 is an enlarged cross-sectional view of the recirculated wort outlet taken along the line 8—8 of Fig. 3, Fig. 9 is a top plan view of said outlet shown in Fig. 8, Fig. 10 is an enlarged fragmentary view of a wort draw-off pipe and support therefor, and Fig. 11 is an enlarged fragmentary view of a protective slotted shield which allows liquid to pass into the vertical tubular sight glasses.

Referring now to the drawings in detail, it will be seen that the invention is embodied in a straining tank or grain extractor or lauter tub 1 having an elliptical head 2, a cylindrical shell 3, and a conical bottom 4. The head 2 is provided with manholes 5 with sliding covers 6 thereon and a centrally located vent pipe 7. The shell or wall 3 is provided with a manhole 8 and a suitable vertical sight glass 9 therein for viewing the contents. The conical bottom 4 has an outlet valve 10 at the very bottom, and an enlarged annular portion 11 having a conical screen 12, which is removable, forming a portion of said conical bottom 4 with an annular wort draw-off chamber 13 therebetween. The bottom 4 is provided with an inlet pipe 14 with a valve 15 therein for controlling the flow of incoming mash or grain and water.

The cylindrical shell 3 is provided with a multiplicity of wort draw-off levels L, as best shown in Figs. 4 and 5. A lower draw-off arrangement is shown in Fig. 6. Each wort draw-off level L comprises a header 16 which extends diametrically across the tank 1. A plurality of draw-off pipes 17 extend horizontally from the header 16 on either side thereof in spaced relation. The pipes 17 are secured to the header 16 by suitable fittings 18 with their opposite ends 19 held at substantially the same horizontal level by means of supports 20 secured to the tank wall 3. Each support 20 has two fingers 21 extending upwardly in the shape of a V to act as a cradle for the pipe 17. The supports 20 also support a circular draw-off ring or pipe 22 which is spaced inwardly from the tank wall 3 but outwardly from the ends 19 of the pipes 17. The pipes 17 in the level shown in Fig. 4 are offset with respect to the pipes 17 in Fig. 5, so that in the eight upper draw-off levels L shown, the first, third, fifth and seventh levels are like that shown in Fig. 5 and the second, fourth, sixth and eighth levels are like that shown in Fig. 4.

Pipes 23 and 24 are secured to the ends of the headers 16 and extend angularly toward each other to a central connection 25 to which is connected a water pipe 26 leading to a water header 27. The water pipe 26 has a suitable valve 28 therein. The central connection 25 also has a wort pipe 29 connected thereto which leads to a wort header 30. The wort pipe 29 has a suitable valve 31 therein.

The water header 27 is connected to a suitable source of water controlled by a valve 32 and extends upwardly to a suitable flushing ring 33 mounted in the elliptical head 2.

The wort header 30 has suitable piping 34 connected to the lower end thereof which leads to a conventional grant 35 having an outlet 36 therein for the desired wort and a recirculating outlet 37 for recirculating the wort if desired. A grant 35 is also provided with a drain 38. A suitable pipe 39 extends from said recirculating outlet 37 to a pump 40 which pumps the wort upwardly through a vertical pipe 41 having a valve 42 therein to a special side and flat discharge nozzle 43, best shown in Figs. 8 and 9, which discharges the recirculated wort against the inner surface of the tank wall 3 so as to minimize turbulence.

Each of the wort pipes 29 connected to a header 16 positioned within a particular level L is provided with a sampling line 44 having a valve 45 therein. The sampling lines 44 each lead to a saccharometer 46 positioned on or near the grant 35. The sampling lines 44 are provided so that the total solids content of the wort taken off at any particular level L can be accurately determined. The amount of wort taken from any level can be varied as desired by operating the wort valve 31 to either fully or partially open or close off the draw-off system for a particular level. The saccharometers 46 are preferably Balling saccharometers or hydrometers or other devices which show directly the percentage of sugars, dextrins and other dissolved solids in the wort.

Each draw-off pipe 17 is elongated and elliptical in shape as best shown in Fig. 10. The elliptical surfaces 47 and as well as the end surface 19 are provided with relatively narrow openings or slits 48. The openings or slits preferably are approximately ½ inch long and 0.025 inch wide although holes of the same width may be used if desired. The 0.025 inch dimension is critical for grains of the size normally used in a typical brewing operation and should not be increased even as much as 0.002 inch since such will allow undesired particles from the grains or husks to pass into the wort draw-off system thereby causing the wort to be cloudy or otherwise unsatisfactory. The openings 48 are positioned throughout the length of each of the pipes 17 and at the ends 19 thereof and completely around the periphery of the circular pipe 22 so that wort is drawn off substantially uniformly over the entire area of a particular level L. The space 49 between the edges of the staggered slots 48 in different rows is preferably about ⅛ inch. The elliptical end 19 of each pipe is about 4⅛ inches high and one inch wide. The pipes 17 are preferably about 10⅜ inches apart horizontally. The screen 12 is preferably a conical sheet which may be made in removable sections, having openings therein of the same dimensions as the slits or holes 48. The pipes 17 and 22 are preferably elliptical to prevent the accumulation of grains thereon as is the case with circular pipes on which grains tend to settle and accumulate to the point where the space between adjacent pipes may be bridged by the accumulation. The elliptical shape also aids in the removal of grains from the tank.

The center of each level L is spaced from the center of the level above or below a distance of 9 inches, which distance has been found to produce exceptionally good results. Levels whose centers are spaced 12 inches apart do not produce results which are comparable to the 9 inch spacing, nor is is advantageous to have the levels substantially closer than 9 inches. This distance of about 9 inches is important, just as the 12 or 13 inch height in conventional lauter tubs is important, since heights greater than about 13 inches result in too much pressure or grains compacted too tightly so that too much suction must be used which in turn causes the grains to become pressed tighter against the screen.

The cylindrical shell 3 also has a shield 50 with slots 51 therein, as best shown in Fig. 11, to prevent grains from entering the space 52 between said shield 50 and said tank 3. A pipe 53 is connected to said space 52 and has a vertically extending tubular sight glass 54 extending upwardly therefrom. The height of the liquid in the sight glass 54 is the same as the liquid level within the tank. Another vertically extending tubular sight glass 55 is secured to the main wort collection header 30. The difference in the height of the liquids in sight glasses 54 and 55 is kept at a predetermined quantity to provide for more efficient operation. In effect, the difference in level indicates the rate at which the wort is being drawn off. This difference can be controlled automatically if desired. Each of the sight glasses has a suitable small valve 56 at the bottom thereof to render it inoperative.

As best shown in Fig. 7, the portion of the inlet pipe 14 within the tank is elliptical and is provided with an elliptical discharge end portion 57 so as not to obstruct or collect grains on the top thereof when the grains are being removed. The tank shown in the drawings is about 9½ feet in diameter with the top portion of the cylindrical shell 3 being about 16 feet vertically above the bottom of the conical bottom 4 and the bottom portion of the cylindrical shell 3 being about 4 feet vertically above said bottom, although these dimensions may be varied somewhat depending upon the capacity desired.

In operation, and with all of the tank surfaces and pipes clean and immaculate and all valves closed, the valve 15 is opened and mash or brewer's grains with sufficient water are pumped in through the inlet 14 at the bottom of the tank 1 until the top level of said mixture reaches about to the point 58 in the tank. The inlet valve 15 is then turned closed. After a proper rest period, the valves 31 of several or all levels are then opened and the wort is circulated through the grant 35 until clarity is reached. After the rest period, the first wort or wort initially extracted usually is not as clear as desired and is pumped back into the tank from the grant 35 through the pipes 39 and 41 to the nozzle 43, as shown in Figs. 1, 3, 8 and 9 against the side of the wall 3 so as not to disturb the grain and water in the lower portion of the tank. The wort from the tank is continuously circulated over the grant and back into the tank 1 until it runs clear. This usually takes about fifteen to twenty minutes. Thereafter, the wort is collected for use in the brewing operation.

The valve 60 is then opened so as to allow sparge water to enter the chamber 13 and pass through the screen 12 into tank and filter through the grains thereby removing the extract from the grains. The resulting wort is taken off uniformly at various levels through each of the wort draw-off pipe levels L and through each of the pipes 17 and 22 and through the connections 23 and 24 and into the headers 16. If desired, the sparge water can be introduced through any of other levels within the tank and the wort removed from the remaining levels.

During the sparging operation, after the first wort is gone, the specific gravity of the wort of each of the pipe levels L is carefully watched and the wort valves 31 are used to control the amount of wort which is allowed to be taken off at any particular level. Of course, the small valves 45 in the sampling lines 44 are opened so that wort is allowed to pass through the sampling lines to the saccharometers 46 for each of the sampling lines. If desired, automatic controls (not shown) may be included so that the saccharometers 46, or devices operating on similar or different bases, automatically open and close the wort valves 31 so that each piping level L extracts a certain quantity of wort of certain desired characteristics.

During the extraction, it may become necessary to close the wort valves 31 of the lower pipe levels or of any other levels as the grains become spent. After sufficient wort has been extracted from a batch of grains and the grains become fully spent so that it is no longer desirable to make further extractions therefrom, the valve 60 is turned off so as to shut off the supply of incoming sparge water. The individual wort valves 31 are allowed to remain open until the wort from each draw-off level L reaches a predetermined value at which time that particular valve for said level is closed. After all of the valves 31 are closed, or even shortly prior thereto, the large outlet valve 10 is opened and all of the grains with some amount of wort that remains fall through the opening 61 in the bottom of the tank.

With the outlet valve 10 still open, the tank 1 is flushed and cleaned. This is accomplished by opening the water valves 28 (with the wort valves 31 closed) and allowing water to surge through each of the draw-off pipe levels as well as through the top cleaning pipe 33 which is preferably circular with holes in the bottom portion thereof. Thus, all pipes are used to flush out the tank with water to remove all spent grains or portions thereof from the equipment. After this initial flushing, the sliding covers 6 on the top manholes 5 are opened and the tank is further flushed with hoses through the top manholes to make absolutely certain that all surfaces are absolutely clean.

The various pipe levels and surfaces and fittings can be inspected visually through the sight glasses 9, the top manholes 5, and the side manhole 8. After this, the manholes can be covered, the main outlet valve 10 closed, and the water valves 28 and draw-off valves 31 placed in their proper position. The inlet valve 15 is then opened and another batch of mash or grains is allowed to enter into the straining tank and the operation previously described is repeated.

The invention is intended to cover all changes and modifications of the example of the invention herein chosen for purposes of the disclosure, which do not constitute departures from the spirit and scope of the invention.

What is claimed is:

1. In a method for drawing off wort from an upstanding straining tank containing mash, the steps of drawing off the first wort through a multiplicity of draw-off levels each positioned below the top of the mash, introducing sparge water directly into said mash at a point below the top of said mash, and, drawing off the wort simultaneously through said multiplicity of draw-off levels.

2. In a method for drawing off wort from an upstanding straining tank containing grains and water, the steps of drawing off the first wort through a multiplicity of draw-off levels positioned below the top of the grains substantially uniformly over the entire area of each of said draw-off levels, introducing sparge water directly into the grains below the top level thereof, simultaneously drawing off the wort uniformly over the entire area of each of said draw-off levels at the same time while introducing said sparge water, and stopping the flow of the wort from each of said draw-off levels when the specific gravity thereof becomes too low to be useful for making beer.

3. In a method for drawing off wort from an upstanding straining tank containing brewer's grains and water, the steps of drawing off the first wort through a multiplicity of draw-off levels positioned below the top of the grains and water, introducing sparge water directly into said grains through a plurality of draw-off levels, drawing off the wort through a plurality of draw-off levels at different draw-off levels from those in which sparge water was introduced, and stopping the flow of the wort from each of said latter mentioned draw-off levels when the specific gravity thereof becomes too low to be useful for making beer.

4. In a method for drawing off wort from an upstanding straining tank, the steps of drawing off the first wort through a multiplicity of draw-off levels positioned at different levels below the top of the settled grains, introducing sparge water directly into said grains through alternate draw-off levels within said multiplicity of draw-off levels, drawing off the wort through the remaining alternate draw-off levels which introducing said sparge water, and stopping the flow of the wort from each level when the specific gravity thereof becomes too low to be useful for making beer.

5. A method for drawing off wort from an upstanding straining tank containing brewer's grains and water, said method including the steps of drawing off the first wort through a multiplicity of vertically spaced draw-off levels substantially uniformly over the entire area of each of said draw-off levels each positioned below the top of the grains, circulating said first wort back into said tank until said first wort runs clear, drawing off said first wort from the straining tank, introducing sparge water directly into the grains at a point below the top of the grains and simultaneously, drawing off the wort uniformly over the entire area of each of said draw-off levels while introducing said sparge water until the flow of the wort from each of said draw-off levels falls below a specific gravity too low to be useful for making beer.

6. A method for drawing off wort from an upstanding straining tank containing mash of grains and water, said grains forming a grain bed when settled in said straining tank, said method including the steps of filling said straining tank with mash and then stopping the flow of said mash into the tank, drawing off the first wort substantially uniformly from spaced points within and substantially throughout the entire volume of said grain bed thereby reducing the level of the liquid in said tank to about the top level of said grains when settled, introducing sparge water into said grain bed and substantially at the same time drawing off a substantially equal amount of wort throughout the entire volume of said grain bed from spaced points therein thereby maintaining the level of the liquid in the tank relatively constant and slightly above the top level of said grain bed, and stopping the draw-off of the wort from said draw-off levels when the specific gravity thereof falls too low to be useful for making beer.

7. A method for drawing off wort from an upstanding straining tank containing mash of grains and water, said grains forming a grain bed when settled in said straining tank, said method including the steps of filling said straining tank with mash and then stopping the flow of said mash into the tank, drawing off the first wort substantially uniformly over the entire horizontal area of a plurality of vertically spaced draw-off levels positioned within said grain bed thereby reducing the level of the liquid in said tank to the top level of said grains when settled, introducing sparge water into said grain bed and substantially at the same time drawing off a substantially equal amount of wort through a plurality of vertically spaced draw-off levels within said grain bed thereby maintaining the level of the liquid in the tank relatively constant and slightly above the top level of said grain bed, and stopping the draw-off of the wort from said draw-off levels when the specific gravity thereof falls too low to be useful for making beer.

8. A method for drawing off wort from an upstanding straining tank containing mash of grains and water, said grains forming a relatively deep grain bed when settled in said straining tank, said method including the steps of filling said straining tank with mash substantially to the top thereof and then stopping the flow of said mash into the tank, drawing off the first wort substantially uniformly over the entire horizontal area of a plurality of vertically spaced draw-off levels each permanently positioned within said grain bed thereby reducing the level of the liquid in said tank to the top level of said grains when settled, introducing sparge water into said grain bed from at least one draw-off level positioned within said grain bed and substantially at the same time drawing off a substantially equal amount of wort through a plurality of the remaining vertically spaced draw-off levels within said grain bed thereby maintaining the level of the liquid in the tank relatively constant and slightly above the top level of said grain bed, and stopping the draw-off of the wort from said draw-off levels when the specific gravity thereof falls too low to be useful for making beer.

References Cited in the file of this patent

UNITED STATES PATENTS

| | | |
|---|---|---|
| 804,979 | Rach | Nov. 21, 1905 |
| 2,229,875 | Schwarz et al. | Jan. 28, 1941 |
| 2,758,030 | Metz | Aug. 7, 1956 |